US005912691A

United States Patent [19]

Mey et al.

[11] Patent Number: 5,912,691

[45] Date of Patent: Jun. 15, 1999

[54] ELECTROGRAPHIC PRINTING METHOD AND APPARATUS

[75] Inventors: William Mey, Rochester; Thomas M. Stephany, Churchville; J. Kelly Lee, Rochester, all of N.Y.

[73] Assignee: Eastman Kodak Company, Rochester, N.Y.

[21] Appl. No.: 08/783,953

[22] Filed: Jan. 16, 1997

Related U.S. Application Data

[63] Continuation-in-part of application No. 08/294,294, Aug. 23, 1994, abandoned.

[51] Int. Cl.[6] .............................. G03G 15/01; G11B 9/00; B41J 2/385

[52] U.S. Cl. .............................................. 347/115; 347/112

[58] Field of Search .............................. 347/55, 112, 115, 347/117; 346/74.2

[56] References Cited

U.S. PATENT DOCUMENTS

| | | | |
|---|---|---|---|
| 3,879,737 | 4/1975 | Lunde | 347/55 |
| 3,914,771 | 10/1975 | Lunde et al. | 346/74.2 |
| 3,967,892 | 7/1976 | Whited | 399/271 |
| 4,739,348 | 4/1988 | Ando et al. | 347/55 |
| 4,875,060 | 10/1989 | Masuda et al. | 347/147 |

FOREIGN PATENT DOCUMENTS

| | | |
|---|---|---|
| 04141459 | 5/1992 | Japan . |

*Primary Examiner*—Fred L. Braun

*Attorney, Agent, or Firm*—Thomas H. Close

[57] ABSTRACT

An electrographic printing apparatus for forming a toner image on a recording medium, includes: a) a magnetic brush having a rotatable magnetic core and a stationary outer cylindrical shell; b) an addressable array of transfer electrodes on the outer shell, the array including a plurality of parallel strips of high magnetic permeability, electrically conductive material arranged circumferentially around the shell and disposed under an electrically insulating layer, the insulating layer defining printing gaps over the strips; c) a receiver electrode arranged in spaced relation to the array of transfer electrodes to define a recording region through which a receiver can be moved; d) a developer supply for supplying developer powder having an electrically conductive, magnetic carrier and a first colored toner to the magnetic brush, and e) an electronic circuit adapted to selectively apply voltage pulses to the transfer electrodes to cause the toner to transfer from the developer powder to the receiver in an image-wise pattern. A method, includes the steps of: providing a developer including a toner; forming a plurality of parallel circumferential ridges of developer, the ridges having a length substantially greater than their width; providing a corresponding plurality of printing gaps in the central portions of the ridges of developer, the printing gaps having a length substantially less than the length of the ridges; and selectively transferring toner at the printing gaps from the ridges to a receiver in an image wise manner.

16 Claims, 7 Drawing Sheets

ELECTROGRAPHIC PRINTING METHOD AND APPARATUS

CROSS REFERENCE TO RELATED APPLICATIONS

This is a continuation-in-part of application Ser. No. 08/294,294, filed Aug. 23, 1994, now abandoned entitled "ELECTROGRAPHIC PRINTING PROCESS AND APPARATUS" by William Mey et al.

FIELD OF THE INVENTION

The invention relates generally to the field of electrographic printing, and in particular to electrographic printing wherein a toner is magnetically transported to a recording gap, and a recording electrode is employed to selectively transfer the toner across the gap to a receiver in an image-wise pattern.

BACKGROUND OF THE INVENTION

An electrographic printing process wherein a magnetically responsive electrically conductive toner material is deposited directly on a dielectric receiver as a result of electronic current flow from an array of magnetically permeable styli into toner chains formed at the tips of the styli is disclosed in an article entitled "Magnetic Stylus Recording" by A. R. Kotz, Journal of Applied Photographic Engineering 7:44–49 (1981).

The toner material described by Kotz is a single-component, magnetically responsive, electrically conductive toner powder, as distinguished from multiple-component carrier/toner mixtures also used in electrophotographic development systems. The magnetically permeable styli described by Kotz are a linear array of magnetically permeable wires potted in a suitable material and arranged such that the ends of the wires are perpendicular to the receiver surface. A major advantage of this system is that it operates in response to relatively low voltage control signals (of the order of 10 volts), thereby allowing direct operation from inexpensive integrated circuits.

One shortcoming of the printing process described by Kotz is that single-component magnetically conductive toners have a limited color gamut (black and brown) and therefor are not suitable for making color images. It would be desirable to make a full color printer using an electrographic printing technique.

SUMMARY OF THE INVENTION

The present invention is directed to overcoming one or more of the problems set forth above. Briefly summarized, according to one aspect of the present invention, an electrographic printing apparatus for forming a toner image on a recording medium, includes: a) a magnetic brush having a rotatable magnetic core and a stationary outer cylindrical shell; b) an addressable array of transfer electrodes on the outer shell, the array including a plurality of parallel strips of high magnetic permeability, electrically conductive material arranged circumferentially around the shell and disposed under an electrically insulating layer, the insulating layer defining printing gaps over the strips; c) a receiver electrode arranged in spaced relation to the array of transfer electrodes to define a recording region through which a receiver can be moved; d) a developer supply for supplying developer powder having an electrically conductive, magnetic carrier and a first colored toner to the magnetic brush, and e) an electronic circuit adapted to selectively apply voltage pulses to the transfer electrodes to cause the toner to transfer from the developer powder to the receiver in an image-wise pattern.

The electrographic printer according to the present invention is advantageous in that a low priced, plain paper, color electrographic printer can be provided, for example for home use. The printer can be controlled with low voltage pulse control circuits, which are relatively low cost, and the transfer electrode array is relatively inexpensive to produce.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
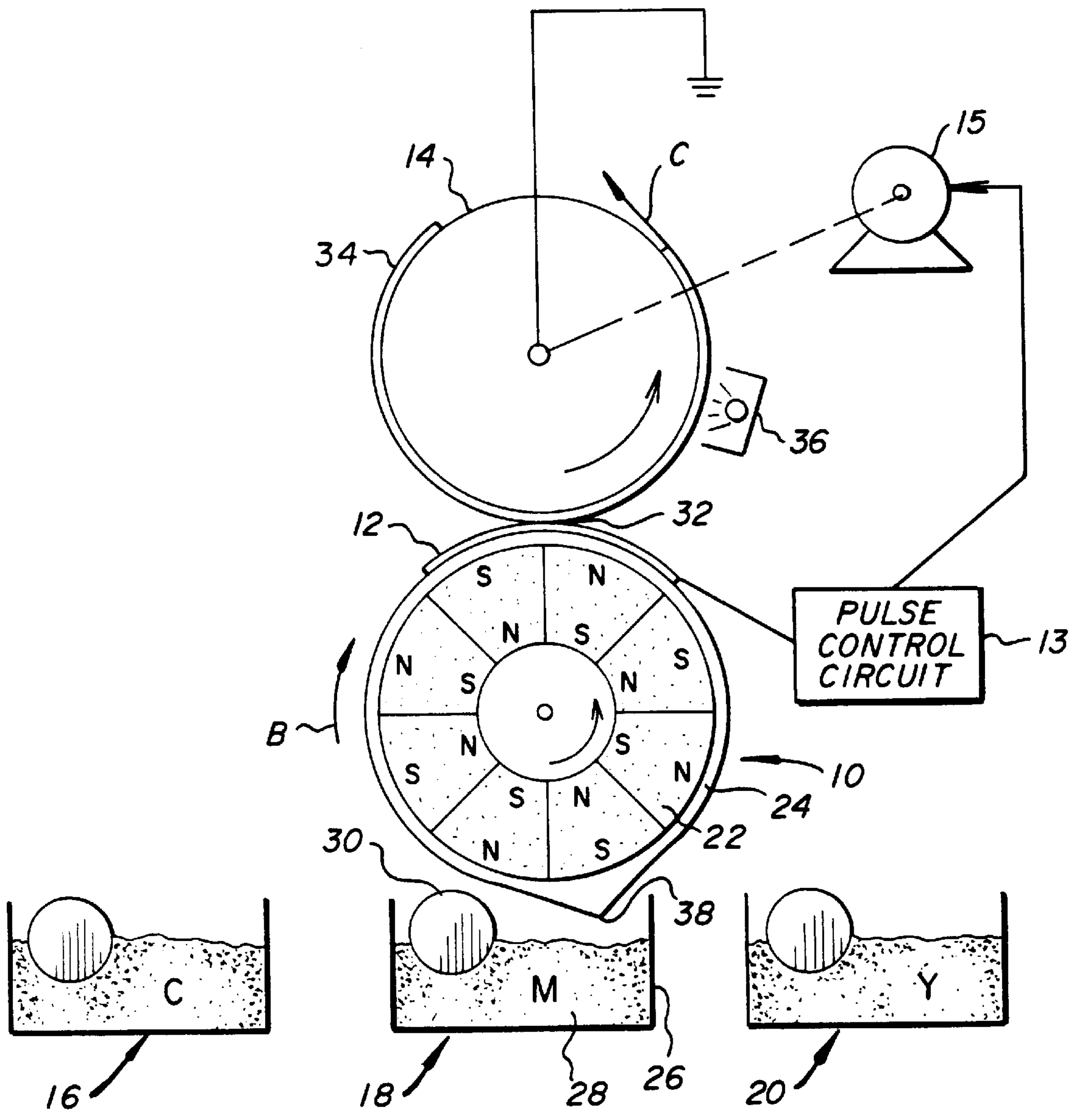
FIG. 1 is a schematic side view of an electrographic color image printing apparatus according to the present invention.

Beginning with FIG. 1, an electrographic color image printer according to the present invention is shown. The printer includes a magnetic brush 10, an addressable array of transfer electrodes 12 driven by a pulse control circuit 13, a grounded receiver electrode 14 and driven by a stepper motor 15, and three developer supplies 16, 18 and 20 for supplying cyan, magenta and yellow developer powder to the magnetic brush 10, respectively. The stepper motor 15 is also driven by pulse control circuit 13 to synchronize the printing of the different colored developers.

The magnetic brush 10 includes a rotatable magnetic core 22 and stationary outer cylindrical shell 24 characterized by low magnetic permeability and high electrical conductivity. The rotatable magnetic core includes a plurality of permanent magnetic sectors arranged about and extending parallel to the cylindrical surface of the shell 24 to define a cylindrical peripheral surface having alternating North and South magnetic poles. In operation, the magnetic core 22 rotates in a counter clockwise direction as indicated by arrow A to transport developer around the circumference of shell 24 in a clockwise direction as indicated by arrow B.

Each of the three developer supplies 16, 18, and 20 is constructed in a similar manner and is moveable from a position immediately adjacent the magnetic brush 10 as illustrated by supply 18, to a position away from the magnetic brush as illustrated by supplies 16 and 20 in FIG. 1. Each developer supply includes a sump 26 for containing a supply of two component developer 28 of the type having an electrically conductive, magnetically attractive carrier and a colored dielectric toner. A suitable developer is described in U.S. Pat. No. 4,764,445 issued Aug. 16, 1988 to Miskinis et al. The performance of the system can be optimized by employing the carrier having a balanced conductivity low enough to triboelectrically charge the toner particle, but high enough to conduct electricity. A rotatable magnetic feed roller 30 is actuable for delivering developer 28 from the sump 26 to the magnetic brush 10 in a known manner.

The array of transfer electrodes 12 are mounted on the outer surface of shell 24 opposite receiver electrode 14 to define a recording region 32. A receiver 34, such as a dielectric coated or plain paper, is wrapped around the receiver electrode 14 and moved through the recording region 32 in the direction of arrow C with one surface in contact with receiver electrode 14. A fusing station 36 may be provided as is known in the art to fuse the toner image to the receiver 34. The fusing station 36 may comprise for example a radiant heat source or a hot roller.

In operation, a first developer supply, say the magenta supply 18 is moved into position adjacent the magnetic brush 10. The magnetic feed roller 30 is actuated to supply developer 28 to the magnetic brush 10. The developer 28 is transported around the periphery of the magnetic brush 10 to the recording region 32, where pulses are selectively applied to the array of transfer electrodes 12 by pulse control circuit 13 to transfer toner from the developer 28 to the receiver 34 in an imagewise manner as the receiver is moved by stepper motor 15 through the recording region 32. After the first color component of the image (e.g. magenta) is formed on the receiver 34, the remaining developer is removed from the magnetic brush 10.

Means are provided on the shell 24 of the magnetic brush 10 such as a lip 38 which extends a distance from the magnetic core 22 so that as the developer is transported around the periphery of the shell, it is moved away from the influence of the magnetic core 24 to the point where it falls back into the sump 26. Alternatively, a wiper (not shown) that is adapted to move across printing electrodes 12 may be employed to remove remaining toner after each color is printed. Next, the developer supply 18 is moved away from the magnetic brush 10 and the next developer supply (e.g. the yellow developer supply 20) is moved into position to replace it.

The receiver 34 is repositioned by pulse control circuit 13 and stepper motor 15 to record the yellow component of the image and insure registration between the various color components and the recording process described above is repeated. Finally, the cyan component of the full color image is recorded in a similar fashion. After the three image components are recorded, the full color image is fused to the receiver 34 at fusing station 36. Alternatively, the toner can be fused or tacked down after each color toner transfer.

Figure 2:
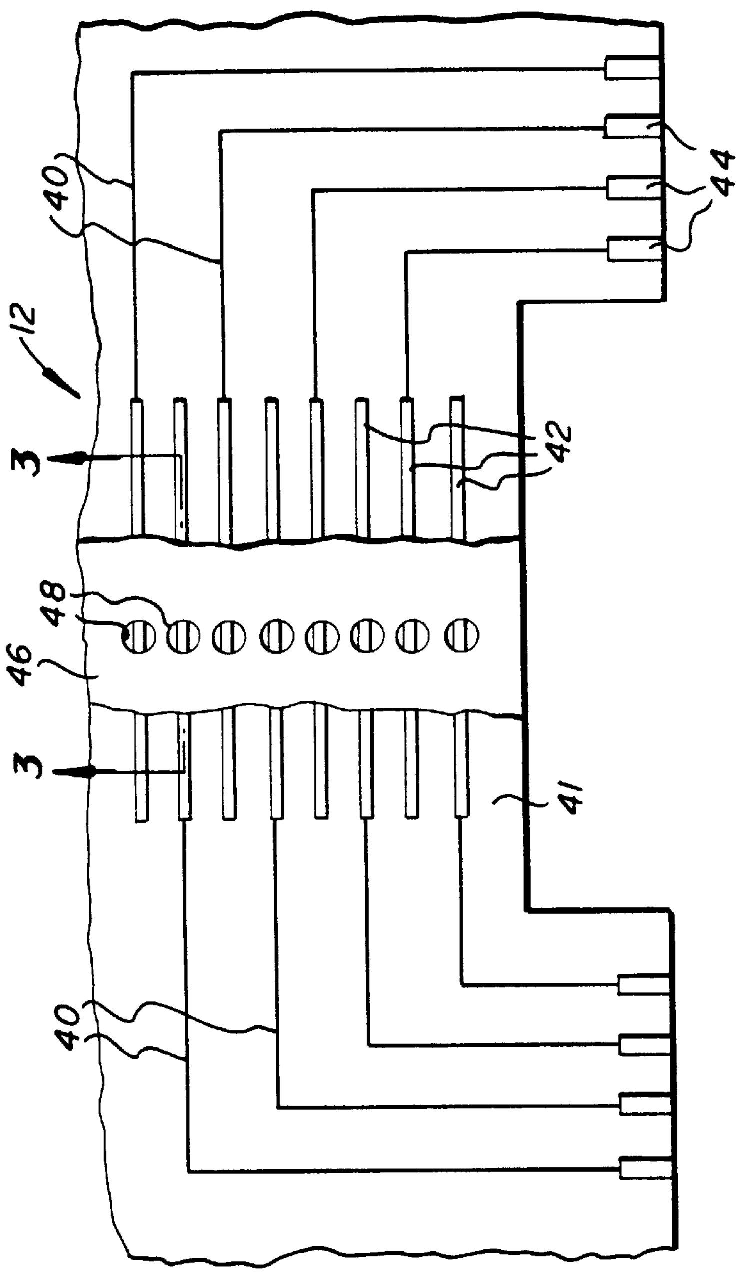
FIG. 2 is a partial plan view of a transfer electrode array used in the printing apparatus of FIG. 1.
Figure 3:
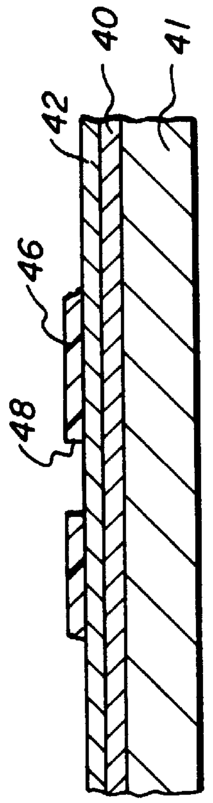
FIG. 3 is a partial cross sectional view of the transfer electrode array taken along line 3—3 in FIG. 2.
Figure 4:
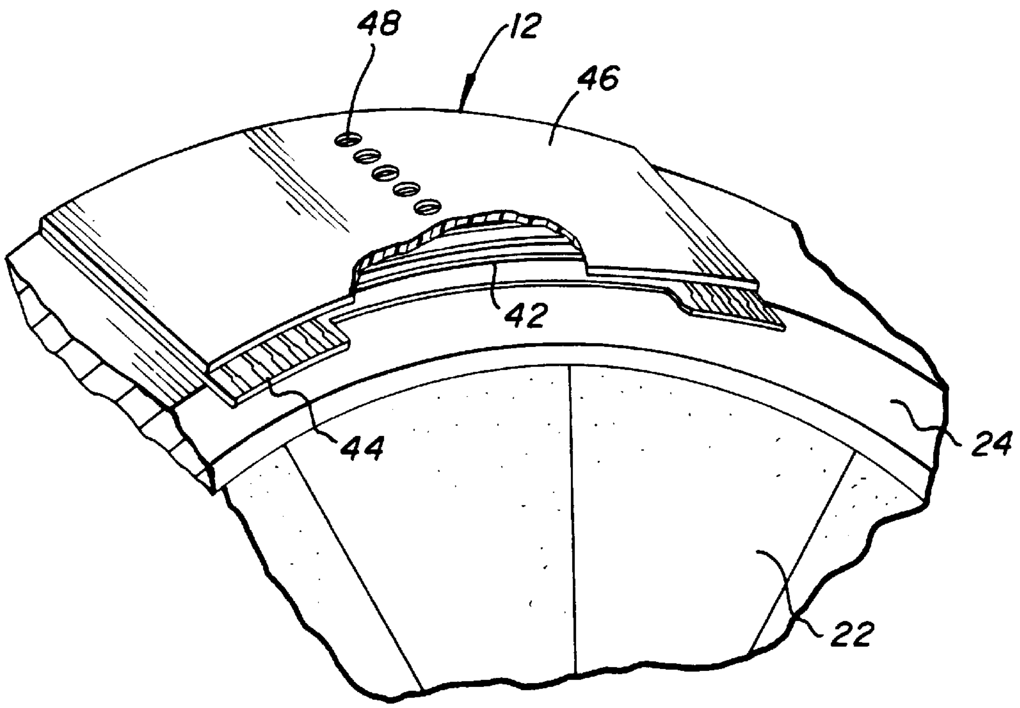
FIG. 4 is a partial perspective, cut-away view of the magnetic brush and transfer electrode array structure of FIG. 1.
Figure 8:
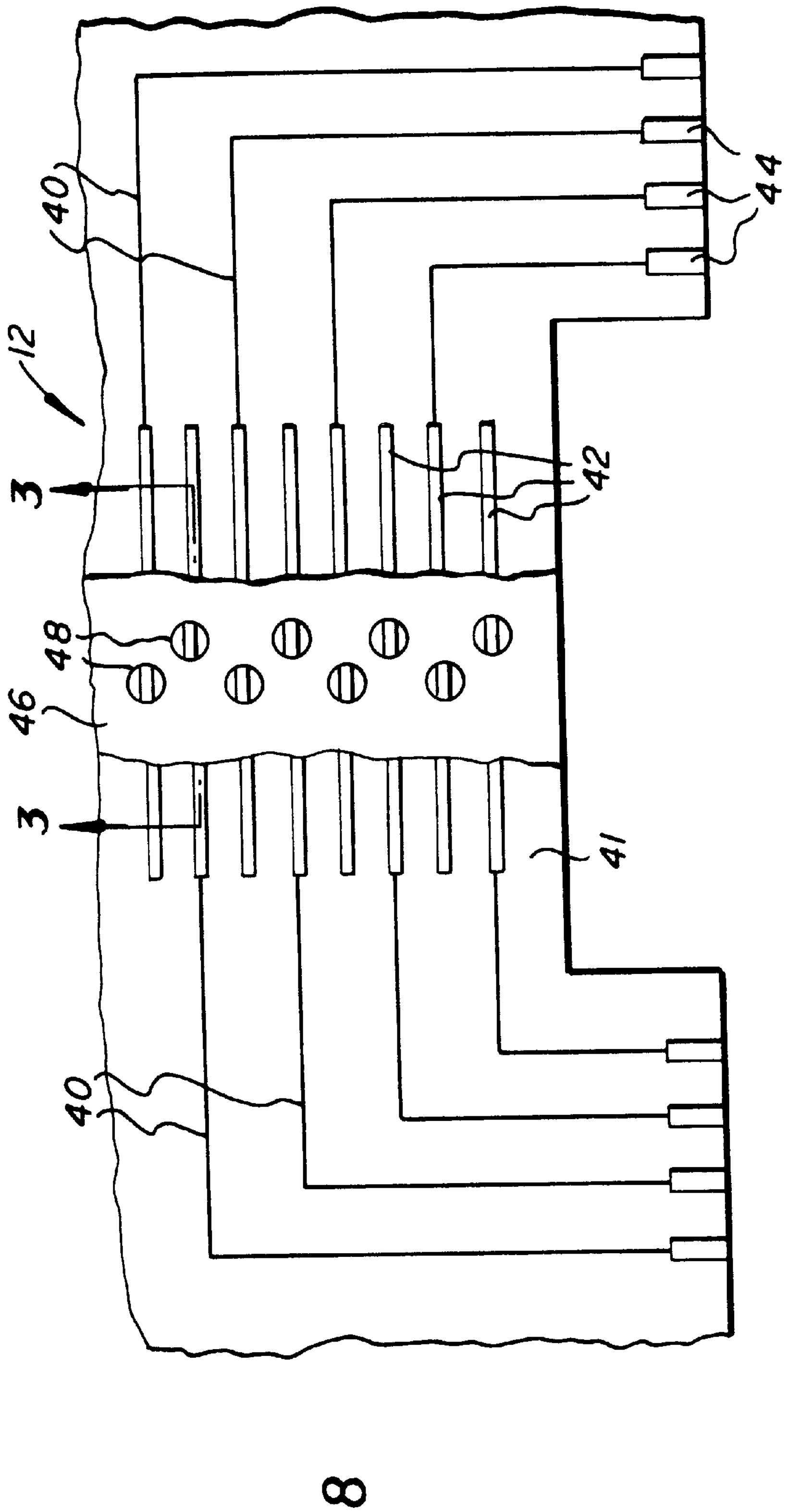
FIG. 8 is a is a partial plan view of a transfer electrode array used in the printing apparatus of FIG. 1, having staggered transfer electrodes.

Turning now to FIGS. 2 and 3, the transfer electrode array 12 according to the present invention will be described. The electrode array 12 is fabricated on flex circuit stock (flexible, metal-clad, dielectric support film for example KaptonÔ from DuPont). A conductor pattern 40 is first formed in a copper layer on the support 41. A central portion of the conductor pattern is then plated with a soft magnetic material such as nickel to about 0.125 mm thick to form an array of magnetically permeable conductive electrodes 42. The conductors terminate in one or more arrays of connector pads 44. A layer 46 of electrically insulating material such as Mylar is placed over the electrodes and the conductors. Holes 48 in the insulating layer 46 are provided over the central portions of the electrodes 42 to form printing gaps. As shown in FIG. 2, the printing gaps are substantially shorter than the electrodes 42. The holes may be arranged in a single line as shown in FIG. 2, or may be staggered to provide more spatial separation between the printing gaps, as shown in FIG. 8. An alternative electrode configuration was constructed using an array of magnetically soft iron wires 0.125 mm in diameter and about 2.5 cm in length secured to a dielectric substrate with adhesive. As shown in FIG. 4 the transfer electrode array 12 is affixed to the outer surface of shell 24 of the magnetic brush. The connector pads 44 extend beyond the edge of the shell 24 and are accessible for connection to the pulse control circuit. The edges of the transfer electrode array may be blended into the surface of the outer shell of the magnetic brush, for example by means of an epoxy ramp, so that the developer can easily flow around the outside of the shell without getting caught on the edges of the array. Alternatively, the transfer electrode array can be inset into the surface of the shell so that the surface of the electrode array is coplanar with the surface of the shell. Furthermore, the ends of the transfer electrode array may be passed through slots in the shell 24 and the electrical connection to the transfer electrode array may be made inside the shell.

Figure 5:
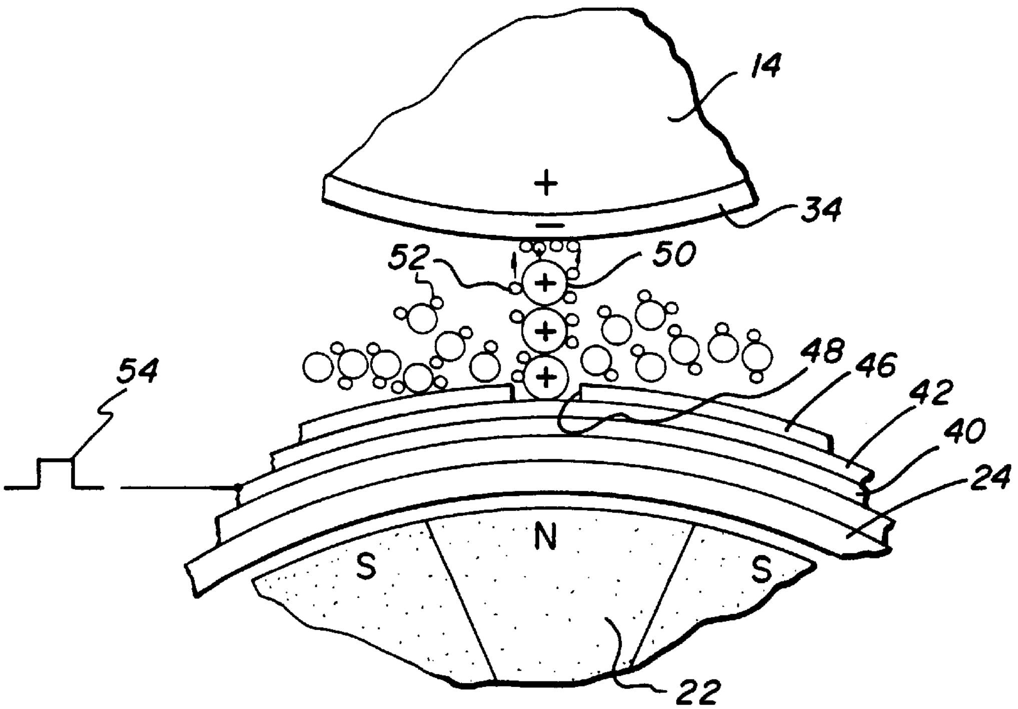
FIG. 5 is a schematic diagram illustrating the transfer of toner from the developer to the receiver.

As shown in FIG. 5, the mechanism for printing is believed to be as follows. The conductive magnetic carrier particles 50 line up in circumferential ridges along the magnetically permeable electrodes 42. As can be seen from FIGS. 2 and 5, the parallel strips forming ridges of developer have lengths substantially greater than their widths, and the printing gaps have lengths substantially less than the lengths of the ridges of developer. At certain periods during the revolution of the magnetic core 22, the conductive magnetic carrier particles in the ridges form chains extending from the printing gaps 48 to the surface of the receiver 34. The fidelity of the image may be improved by employing the timing technique disclosed in U.S. Pat. No. 3,914,771 issued Oct. 21, 1975 to Lunde et al., wherein the voltage pulses are timed to occur when the center of a magnetic pole in the magnetic brush 10 is aligned with the recording region. This assures that the carrier chains are at their maximum height and extend generally radially from the magnetic brush. The magnetic carrier particles 50 (about 30 microns in diameter) are relatively conductive and are normally negatively charged. The toner particles 52 (ranging in size from 3 to 20 microns in diameter) are positively triboelectrically charged and are held to the carrier particles by electrostatic attraction. When a positive voltage pulse 54 (e.g. 10 volts) is applied to the electrode 42 via conductor 40, electrical conduction occurs down the chain of carrier particles. When the voltage on the printing electrodes 12 is sufficiently high, the electrostatic forces holding the toner particles to the carrier particles will be overcome and the toner particles will be pushed away from the carrier particles and attracted to the receiver. The higher the voltage pulse, the more toner particles that will be transferred to the paper and the higher the image density.

Figure 6:
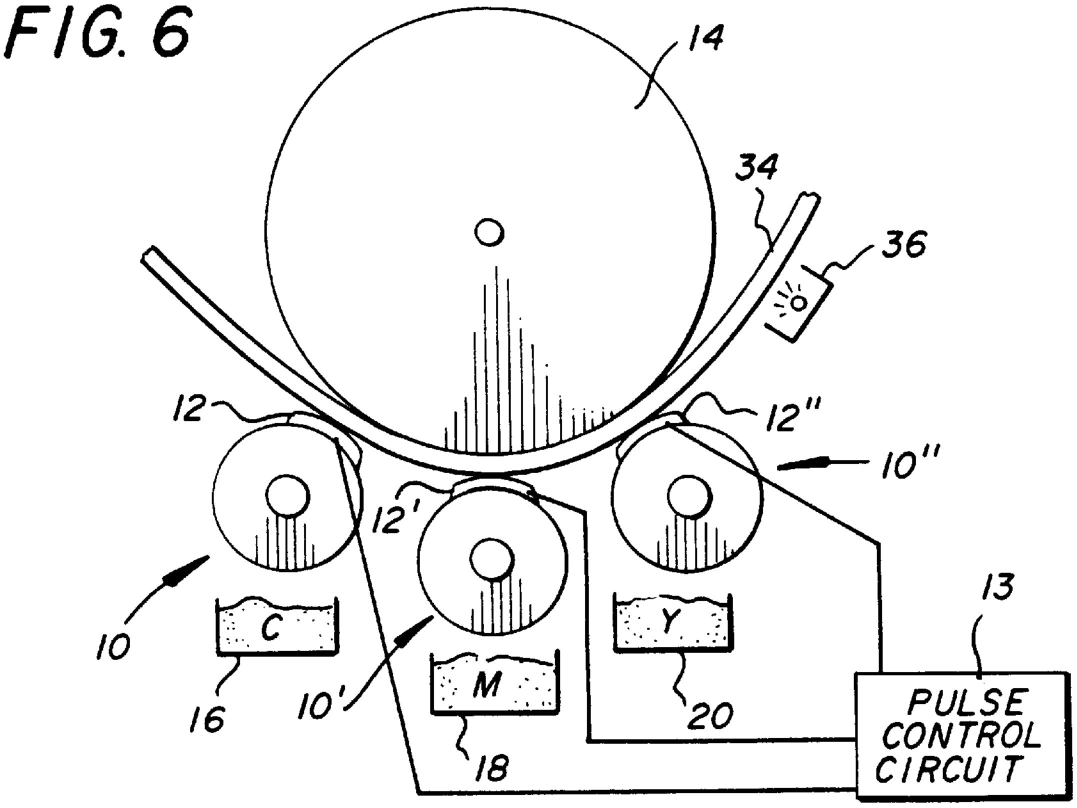
FIG. 6 is a schematic side view of an alternative embodiment of a color image recording apparatus according to the present invention.

Referring now to FIG. 6, an alternative embodiment of an electrographic color printer according to the present invention will be described. In this embodiment, three magnetic brushes 10, 10' and 10" having respective transfer electrode arrays 12, 12' and 12" are provided, as are three developer supplies 16, 18 and 20 having three differently colored toners (e.g. cyan, magenta and yellow). The three magnetic brush and transfer electrode array assemblies are located with respect to the receiver 34 so that they can simultaneously deposit toner on the receiver 34. The pulse control circuit 13 applies control pulses to all three transfer electrode arrays simultaneously with a suitable delay between the respective arrays to compensate for their displacement along the receiver. This arrangement trades off higher equipment complexity and cost for higher speed of operation, since all three color components are printed simultaneously.

Figure 7:
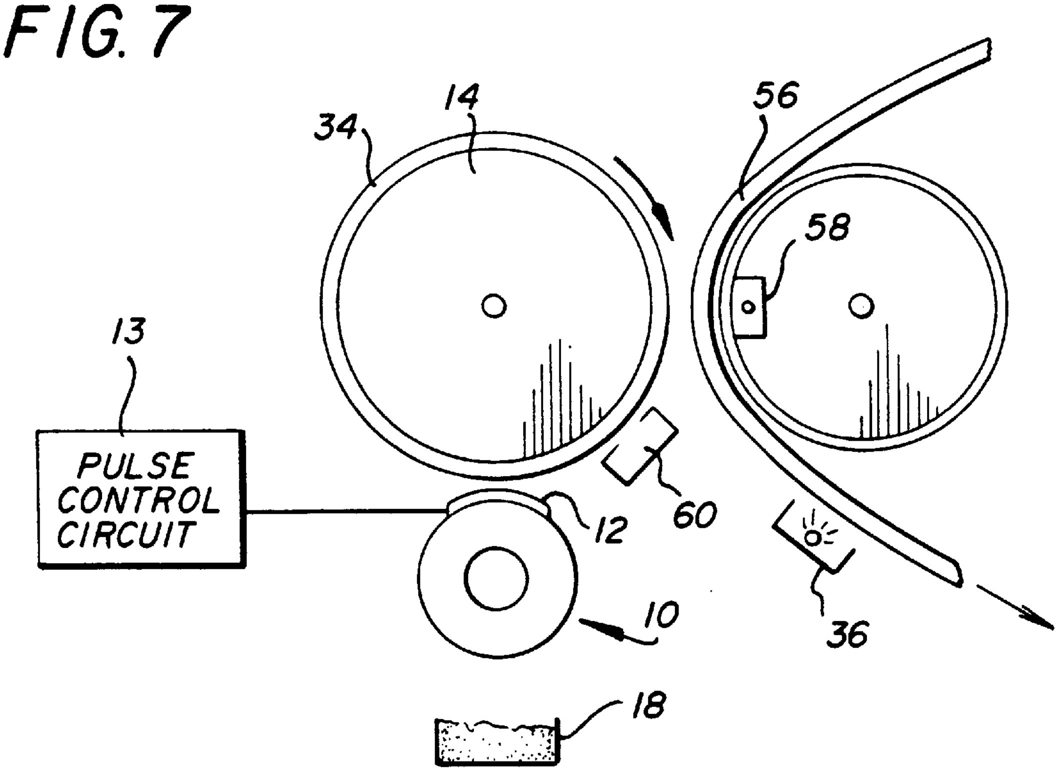
FIG. 7 is a schematic side view of a further alternative embodiment of a color printer according to the present invention.

A further alternative embodiment of the present invention is shown schematically in FIG. 7, where the image is formed first on a receiver 34 that is a permanently attach to receiver electrode 14. The image is then transferred to a second receiver 56, such as plain paper, at a transfer station 58. Since plain paper does not possess as high a resistivity and dielectric constant as would be desirable, this arrangement allows the properties ol the first receiver 34 to be optimized for effective imagewise transfer of toner at the recording region. Toner transfer stations such as station 58 are well known in the electrophotograhic arts and will not be described in detail herein. A cleaning station 60 of conventional construction may be provided to remove any trace of toner left on the receiver 34. The fusing station 36 is located as shown to fuse the image to the second receiver 56. The magnetic brush 10, transfer electrode array 12 and developer supply 18 are shown schematically, and could comprise either the arrangement shown in FIG. 1 or FIG. 6.

Figure 9:
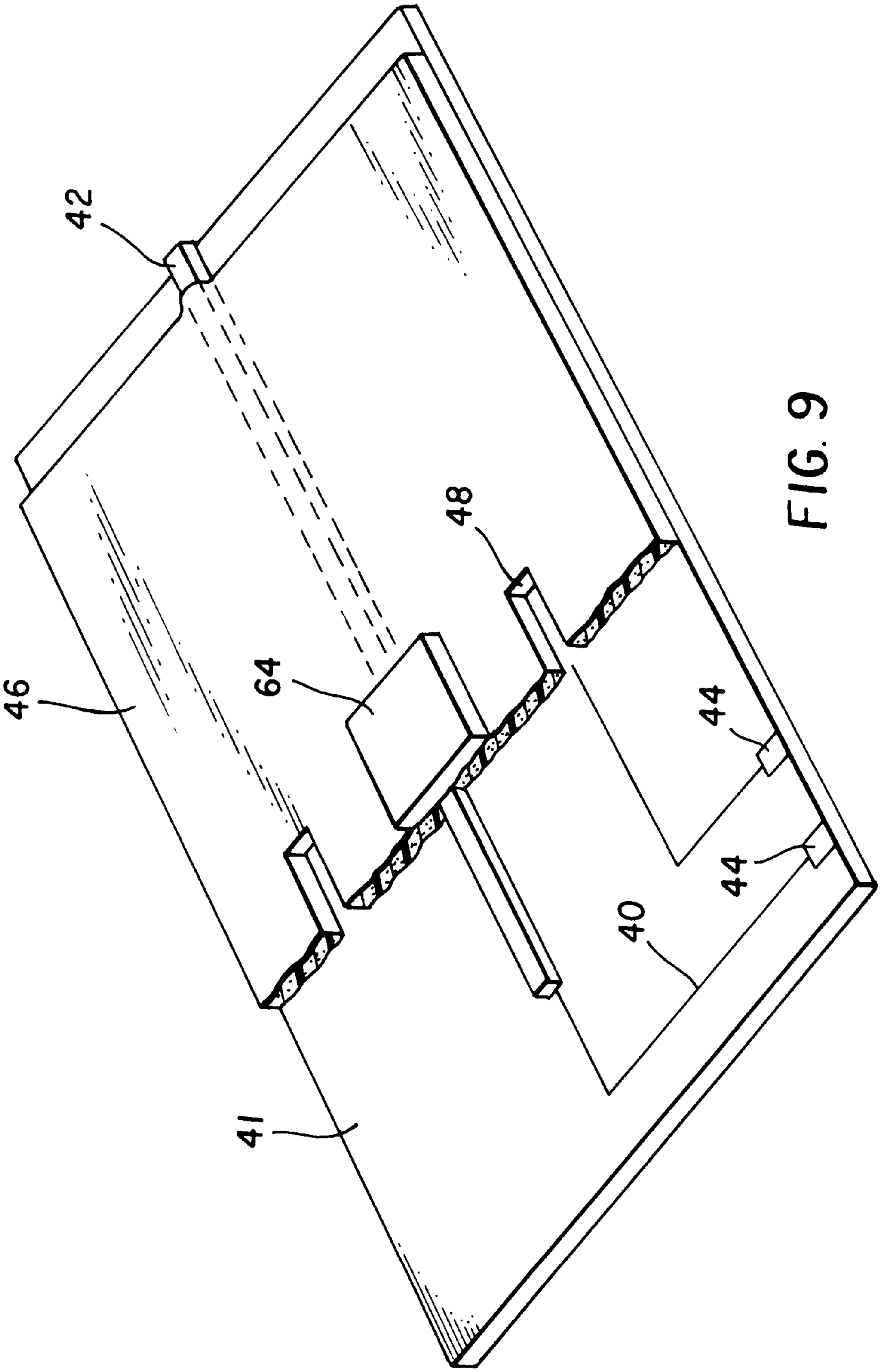
FIG. 9 is a partial perspective view of an alternative configuration for the transfer electrodes.

Referring to FIG. 9, an alternative configuration for the transfer electrodes is shown. A copper conductor pattern 40 is first formed on the support 41 using conventional photolithographic techniques. A central portion of the conductor pattern 40 is then plated with a soft magnetic material, such as permalloy, to form an array of magnetically permeable conductive strips 42. A layer 46 of electrically insulating material such as Mylar™ is laminated over the conductor pattern 40 and magnetically permeable strips 42. Holes 48 are provided in the insulating layer 46 over the central portion of the magnetically permeable conductive strips 42 such that they allow electrical contact to be made between the strip and a transfer electrode pad 64 applied to the surface of the insulating layer 46. The transfer electrode pad 64 can be plated, vacuum deposited or applied using other methods commonly known in the art for applying patterned metal layers to substrates. The dimensions of the transfer electrode pads 64 can be larger than the size of the hole 48 provided in insulating layer 46. As noted above with reference to FIG. 8, the transfer electrode pads 64 may be staggered. The size of the transfer electrodes depend on the resolution of the printer, for example for a printer with 300 dpi, the transfer electrode pads are preferably about 40 microns square.

Figure 10:
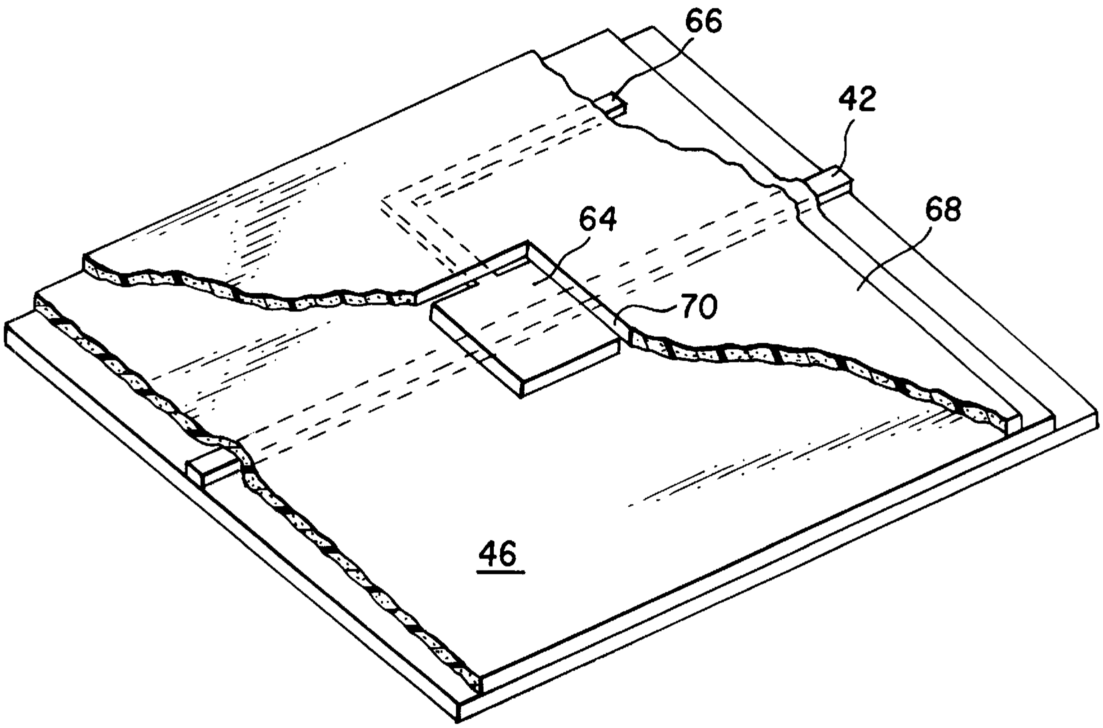
FIG. 10 is a partial perspective view of a further alternative configuration for the transfer electrodes.

FIG. 10 illustrates another alternative configuration for the transfer electrodes which is similar to the one shown in FIG. 9. In the configuration shown in FIG. 10, the electrical connections 66 to the transfer electrode pads 64 are made independently of the magnetically permeable strips 42. An additional insulating layer 68 is provided over the electrical connections 66, with holes 70 in insulating layer 68 over the transfer electrode pads 64. In this example, the magnetically permeable strips need not be conductive, in which case, the insulating layer 46 may be eliminated.

The invention has been described with reference to a preferred embodiment. However, it will be appreciated that variations and modifications can be effected by a person of ordinary skill in the art without departing from the scope of the invention.

Parts List

10 magnetic brush
12 transfer electrode array
13 pulse control circuit
14 receiver electrode
15 stepper motor
16 developer supply (cyan)
18 developer supply (magenta)
20 developer supply (yellow)
22 rotatable magnetic core
24 stationary outer shell
26 sump
28 developer
30 magnetic feed roller
32 recording region
34 receiver
36 fusing station
38 lip on magnetic brush shell
40 conductor pattern
41 support
42 electrodes
44 connector pads
46 insulting layer
48 hole in insulating layer
50 magnetic carrier particle
52 toner particle
54 positive voltage source
56 second receiver
58 transfer station
60 cleaning station
64 transfer electrode pad
66 electrical connections
68 insulating layer
70 hole

We claim:

1. Electrographic printing apparatus for forming a toner image on a recording medium, comprising:

a) a magnetic brush having a rotatable magnetic core and a stationary outer cylindrical shell;

b) an addressable array of transfer electrodes on said outer shell, said array including a plurality of parallel strips of high magnetic permeability, electrically conductive material arranged circumferentially around said shell and disposed under an electrically insulating layer, said insulating layer defining printing gaps over said strips;

c) a receiver electrode arranged in spaced relation to said array of transfer electrodes to define a recording region through which a receiver can be moved;

d) a developer supply for supplying developer powder having an electrically conductive, magnetic carrier and a dielectric toner to said magnetic brush, e) an electronic circuit adapted to selectively apply voltage pulses to said transfer electrodes to cause said dielectric toner to transfer from said developer powder to said receiver in an image-wise pattern; and f) the parallel strips forming ridges of developer having lengths substantially greater than their widths, and the printing gaps having lengths substantially less than the lengths of the ridges of developer.

2. The electrographic printing apparatus claimed in claim 1, further comprising: a second developer supply for supplying a second dielectric toner, whereby multicolored images can be formed.

3. The electrographic printing apparatus claimed in claim 1, further comprising: a second magnetic brush, addressable transfer electrode array, and developer supply for supplying a second dielectric toner, whereby multicolored images can be formed on said receiver.

4. The electrographic printing apparatus claimed in claim 1, further comprising: a transfer station for transferring said dielectric toner from said receiver to a second receiver such as plain paper.

5. The electrographic printing apparatus claimed in claim 1, wherein the transfer electrodes are staggered.

6. Electrographic color printing apparatus for forming a multicolored toner image on a recording medium, comprising:

a) a magnetic brush having a rotatable magnetic core and a stationary outer cylindrical shell;

b) an addressable array of electrically conductive, magnetically permeable transfer electrodes on said outer shell and disposed under an electrically insulting layer, said insulating layer defining a row of printing gaps over said transfer electrodes;

c) a receiver electrode arranged in spaced relation to said array of transfer electrodes to define a recording region through which a receiver can be moved;

d) a plurality of developer supplies for supplying a plurality of differently colored developer powders having an electrically conductive, magnetic carrier and a colored dielectric toner to said magnetic brush, e) an electronic circuit adapted to selectively apply voltage pulses to said transfer electrodes to cause said dielectric toners to transfer from said developer powders to said receiver in an image-wise pattern; and f) the transfer electrodes forming ridges of developer having lengths substantially greater than their widths and the printing gaps having lengths substantially less than the lengths of the ridges of developer.

7. Electrographic printing apparatus for forming a toner image on a recording medium, comprising:

a) a magnetic brush having a rotatable magnetic core and a stationary outer cylindrical shell;

b) a developer supply for supplying developer powder having an electrically conductive, magnetic carrier and a dielectric toner to said magnetic brush;

c) an addressable array of transfer electrodes on the outer shell, the array including means for forming a plurality of parallel circumferential ridges of developer above the outer shell, the ridges of developer having lengths substantially greater than their widths, and means for selectively transferring toner from the ridges to a receiver, the means for selectively transferring having lengths substantially less than the lengths of the ridges of developer;

d) a receiver electrode arranged in spaced relation to said array of transfer electrodes to define a recording region through which a receiver can be moved; and e) an electronic circuit adapted to selectively apply voltage pulses to said transfer electrodes to cause said dielectric toner to transfer from said developer powder to said receiver in an image-wise pattern.

8. An electrographic printing method, comprising the steps of:

a) providing a developer including a toner;

b) forming a plurality of parallel circumferential ridges of developer, the ridges having a length substantially greater than their width;

c) providing a corresponding plurality of printing gaps in the central portions of said ridges of developer, the printing gaps having a length substantially less than the length of the ridges; and d) selectively transferring toner at said printing gaps from the ridges to a receiver in an image wise manner.

9. The electrographic printing method claimed in claim 8, wherein the means for forming a plurality of parallel circumferential ridges of developer comprise strips of magnetically permeable material, and wherein the means for selectively transferring toner comprise transfer electrode pads disposed over the magnetically permeable strips and electrically insulated therefrom.

10. The electrographic printing method claimed in claim 8, wherein the means for forming a plurality of parallel circumferential ridges of developer comprise strips of electrically conductive magnetically permeable material, and wherein the means for selectively transferring toner comprise transfer electrode pads disposed over the magnetically permeable strips and in electrical contact therewith.

11. The electrographic printing method claimed in claim 8, wherein the means for forming a plurality of parallel circumferential ridges of developer comprise strips of nonconductive, magnetically permeable material, and wherein the means for selectively transferring toner comprise transfer electrode pads disposed over the magnetically permeable strips.

12. An electrographic printing method, comprising the steps of:

a) providing a magnetic brush having a rotatable magnetic core and a stationary outer cylindrical shell;

b) providing an addressable array of transfer electrodes on said outer shell, said array including a plurality of parallel strips of high magnetic permeability, electrically conductive material arranged circumferentially around said shell and disposed under an electrically insulating layer, said insulating layer defining a row of printing gaps over said strips;

c) providing a receiver electrode arranged in spaced relation to said array of transfer electrodes to form a recording region therebetween;

d) supplying a developer having an electrically conductive magnetic carrier and a dielectric toner to said magnetic brush;

e) moving a receiver through said recording region;

f) selectively applying voltage pulses to said transfer electrodes sufficient to cause said dielectric toner to transfer from said developer at said printing gaps to said receiver in an imagewise manner; and the parallel strips forming ridges of developer having lengths substantially greater than their widths, and the printing gaps having lengths substantially less than the lengths of the ridges of developer.

13. The electrographic printing method claimed in claim 12, further comprising the step of: transferring a second dielectric toner to said receiver, whereby a multicolored image is formed.

14. The electrographic printing method claimed in claim 12, further comprising the step of: transferring said image wise pattern of dielectric toner from said receiver to a second receiver such as plain paper.

15. A color electrographic printing method, comprising the steps of:

a) providing a magnetic brush having a rotatable magnetic core and a stationary outer cylindrical shell;

b) providing an addressable array of electrically conductive, magnetically permeable transfer electrodes on said outer shell, and an insulating layer over the array with holes in the insulating layer over the central portions of the electrodes to form printing gaps;

c) providing a receiver electrode arranged in spaced relation to said array of transfer electrodes to form a recording region therebetween;

d) supplying a plurality of differently colored developers having an electrically conductive magnetic carrier and a colored dielectric toner to said magnetic brush;

e) moving a receiver through said recording region;

f) selectively applying voltage pulses to said transfer electrodes sufficient to cause said colored dielectric toners to transfer from said developer at said printing gaps to said receiver in an imagewise manner; and g) the transfer electrodes forming ridges of developer having lengths substantially greater than their widths, and the printing gaps having lengths substantially less than the lengths of the ridges of developer.

16. An electrographic printing method, comprising the steps of:

a) providing a magnetic brush having a rotatable magnetic core and a stationary outer cylindrical shell;

b) supplying a developer having an electrically conductive magnetic carrier and a dielectric toner to said magnetic brush;

c) providing an addressable array of transfer electrodes on said outer shell, said array including means for forming a plurality of parallel circumferential ridges of developer above the outer shell, the ridges of developer having lengths substantially greater than their widths, and means for selectively transferring toner from the ridges to a receiver, the means for selectively transferring having lengths substantially less than the lengths of the ridges of developer;

d) providing a receiver electrode arranged in spaced relation to said array of transfer electrodes to form a recording region therebetween;

e) moving a receiver through said recording region; and f) selectively applying voltage pulses to said transfer electrodes sufficient to cause said dielectric toner to transfer from said developer at said recording region to said receiver in an imagewise manner.

* * * * *